United States Patent [19]
Oka

[11] 3,761,858
[45] Sept. 25, 1973

[54] VARIABLE RESISTOR ASSEMBLY WITH COMPOSITE CIRCUITS

[75] Inventor: Shunzo Oka, Hirakata, Japan

[73] Assignee: Matsushita Electric Industrial Co., Ltd., Osaka, Japan

[22] Filed: Oct. 2, 1972

[21] Appl. No.: 293,936

[30] Foreign Application Priority Data
Oct. 7, 1971 Japan ............................... 46/79196

[52] U.S. Cl. ............ 338/48, 338/174, 317/101 CM
[51] Int. Cl. ............................................... H01c 1/16
[58] Field of Search ...................... 338/48, 162, 172, 338/173, 174; 317/101 CM

[56] References Cited
UNITED STATES PATENTS
3,585,559 6/1971 Rozema et al. ...................... 338/48
2,752,537 6/1956 Wolfe ......................... 317/101 CM

*Primary Examiner*—Bernard A. Gilheany
*Assistant Examiner*—D. A. Tone
*Attorney*—Richard K. Stevens et al.

[57] ABSTRACT

A variable resistor assembly with composite circuits in which electrical circuits are previously arranged in set blocks for combination with the variable resistor assembly in order to effect reduction in manpower and automation during assembly, wherein desired composite electrical circuits are arranged on each wafer and are integrally combined with the variable resistor assembly in set blocks using a few connecting lines as possible.

3 Claims, 3 Drawing Figures

VARIABLE RESISTOR ASSEMBLY WITH COMPOSITE CIRCUITS

The present invention relates to a variable resistor assembly with composite circuits wherein required electrical circuits previously arranged in set blocks are combined with the variable resistor assembly to effect reduction in man-power and automation during assembly.

An object of the present invention is to provide a variable resistor assembly with composite circuits comprising a base plate made of an insulating material and having an resistance element and collector on its upper surface, said base plate being mounted on the open end at a lower surface of a cover, contact carrier made of an insulating material and mounted on one extremity of an actuating shaft rotatably mounted on and extending inwardly into said cover, a contactor secured to the lower surface of said adaptor and sliding over said resistance element, a collector provided on said base plate, a portion of said collector being kept in contact wtih said contactor, a housing made of an insulating material and mounted on a lower surface of said base plate with only its upper surface opened, at least one of wafers made of an insulating material and having suitable composite electrical circuits thereon, said wafer being disposed within said housing, and means for electrically connecting the electrical circuit on the wafer to resistance element and collector.

The present invention will be fully described by way of an embodiment in connection with the accompanying drawings in which.

Figures 1, 2:
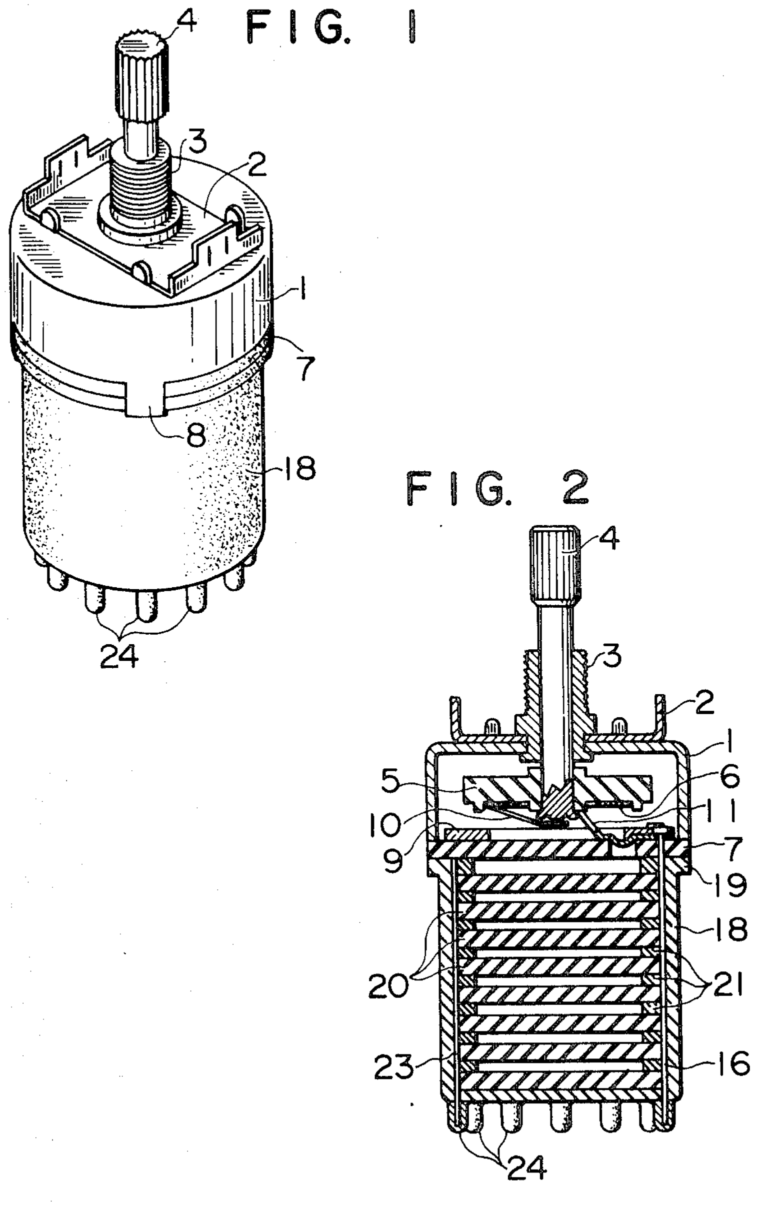
FIG. 1 is a perspective view of an embodiment of a variable resistor assembly with composite circuits according to the present invention.
FIG. 2 is a cross-sectional view of the same.
Figure 3:
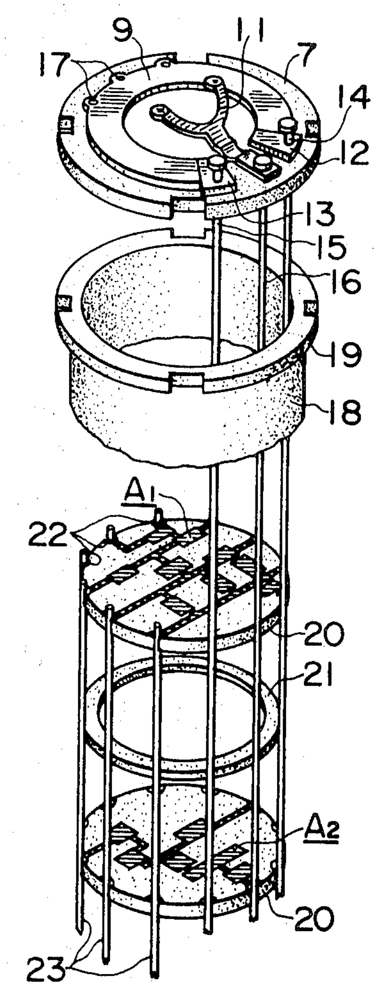
FIG. 3 is a perspective view showing main portions of the same variable resistor assembly as shown in FIG. 1 in a disassembled state.

In FIGS. 1 to 3 there is shown a variable resistor assembly with composite circuits which comprises a metallic cover 1 having its lower surface opened in a cap shape and having an upper surface, on which is mounted a fitting 2 with a bushing 3 secured to the metallic cover 1 and the fitting 2. An actuating shaft 4 passes through the bushing 3, and a contact carrier 5 for mounting a contactor 6 on the bottom surface thereof is secured to one extremity of the actuating shaft 4 within the metallic cover 1. A base plate 7, made of an insulating material, is mounted at the open lower portion of the cover 1 by bending out mount feet 8 extending downwardly from the cover 1. On the upper surface of the base plate 7 is disposed an arcuate resistance element 9 on which an elastic arm 10 of the contactor 6 secured to the carrier 5 slides in response to the rotation of the actuating shaft 4. A collector 11 is kept in contact with the contactor 6 and is mounted on the base plate 7. At both ends of the resistance element 9 are provided terminal means 12 and 13 each made of silver, to which are electrically connected lead terminals 14 and 15, respectively, extending downwardly from the base plate 7. Further the lead terminal 16, electrically connected to the collector 11, also extends downwardly from the base plate 7 as the terminals 14 and 15. A tap terminal 17 is provided at the position intermediate the resistance element 9.

At the lower portion of the base plate 7 is disposed a housing 18 made of an insulating material and having only its upper surface opened, the housing 18 being mounted on the lower portion of the cover together with the base plate 7 through a flange portion provided on the upper surface of the housing 18. Within the housing 18 are arranged a plurality of ring-shaped spacers 21 made of insulating materials in stacked and alternating relationship with a plurality of wafers also made of insulating materials. On the upper surface of each wafer are disposed composite electrical circuits $A_1$, $A_2$, ......., $A_{n-1}$, and $A_n$ having electrical elements such as solid resistors, capacitors, or thermistors. Terminal portions 22 arranged on the circumferential portion of the wafer 20 in each stage are electrically connected to the corresponding terminal portions of the wafer in all other stages by means of lead wires 23 except for three terminal portions in each stage. On the other hand, the remaining three terminal portions in each stage, which were not electrically connected through the lead wires 23, are respectively connected to the lead terminals 14 to 16 which are, in turn, connected to the silver terminal means 12 and 13, and the collector 11, the terminal means 12 and 13 being provided at both the ends of the resistance element 9 of the variable resistor assembly as mentioned above. As the case may be, only three terminal portions selected from the remaining terminal portions of all stages may be connected to the terminals 14 to 16. It will be obvious that terminal portions 22 may, if desired, be connected to the intermediate tap terminals 17 provided on the resistance element 9 of the variable resistor assembly. At the outer portion of the lower surface of the housing 18 are provided external terminals 24 electrically connected to the corresponding lead terminals 14 to 16 and lead wires 23, respectively.

Thus it will be appreciated that a plurality of composite electrical circuits $A_1$, $A_2$, ...... $A_{n-1}$, $A_n$ are arranged in blocks and combined with the variable resistor assembly. In the above-mentioned embodiment the wafer 20 having the composite electrical circuit arranged thereon has been described as being provided in plurality in the housing 18, but it is to be noted that even one wafer may be employed. Further it will be seen that the provision of only one wafer 20 eliminates the use of the spacer 21 because the latter serves only to electrically insulate one wafer from the other, and that other insulating means may be utilized even in the case where a plurality of wafers are employed. Further it is obvious that the lead terminals 14 and 15 provided on both the ends of the resistance element 9, serving as electrical connectors, may be replaced by one terminal and may be constructed using other means such as lead wires. The wafer 20 has a plurality of terminal portions 22 thereon also serving as the electrical connectors. However, the provision of one wafer only requires at least two terminal portions 22, one of which is electrically connected to either one of the lead terminals 14 and 15 serving as the electrical connectors to the resistance element 9, and the other of which is electrically connected to the lead terminal 16 serving as means for determining the resistance of the resistance element 9; on the other hand, the provision of more than one wafer requires, as a whole, additional terminal portions other than the above-mentioned two terminal portions 22 in order to interconnect the composite circuits provided on the wafers.

As mentioned above, the variable resistor assembly with the composite circuits according to the present invention includes the variable resistor integrally combined with the suitable composite circuits provided on the wafer, thus making possible the reduction in manpower and automation during assembly.

What we claim is:

1. A variable resistor assembly with composite circuits comprising:

a. a base plate of an insulating material, b. a resistance element and a collector separately mounted on the upper side of said base plate, c. a cover having an opening at its lower side, said opening being enclosed by said base plate, d. an actuating shaft rotatably supported by said cover and having an end portion extending inside said cover and a contact carrier fixed to said end portion, e. a contactor fixed to said contact carrier and adaptable to bridge said resistance element and said collector, f. a housing of an insulating material having an upper opening and an upper edge defining said opening, said upper edge being adjacent to the lower side of said base plate so that said opening is enclosed by said base plate, g. at least one wafer made of an insulating material and mounted inside said housing, h. a composite circuit provided on said wafer, and i. means for electrically connecting said composite circuit to said resistance element and said collector.

2. A variable resistor assembly with composite circuits according to claim 1 further comprising:

a. wafer means mounted inside said housing and comprising a plurality of said wafers, each provided with said composite circuit, b. first means for electrically connecting said composite circuits provided on the respective wafers each other, said first means including output terminals provided on each of said wafers and connected to said composite circuit provided on said each wafer and lead wires connected to said output terminals of said plurality of said wafers, c. second means for electrically connecting predetermined two portions of a circuit consisting of said composite circuits to said resistance element and said collector, respectively, said means comprising two output terminals electrically connected to said two portions an provided on said wafer means and lead wires connecting said output terminals to said resistance element and said collector, respectively, and d. external terminals mounted on an outside of said housing and connected to said lead wires of said first and second means, respectively.

3. A variable resistor assembly with composite circuits according to claim 1 further comprising wafer means mounted inside said housing and comprising a plurality of said wafers mounted in stacked relationship and spacer means mounted in each space between adjacent two of said wafers thereby insulating output terminals provided on each wafer from those provided on adjacent wafers.

* * * * *